Jan. 21, 1930.  C. H. JACOBS ET AL  1,744,638
APPARATUS FOR LOADING AIRCRAFT
Filed Sept. 10, 1925  5 Sheets-Sheet 1
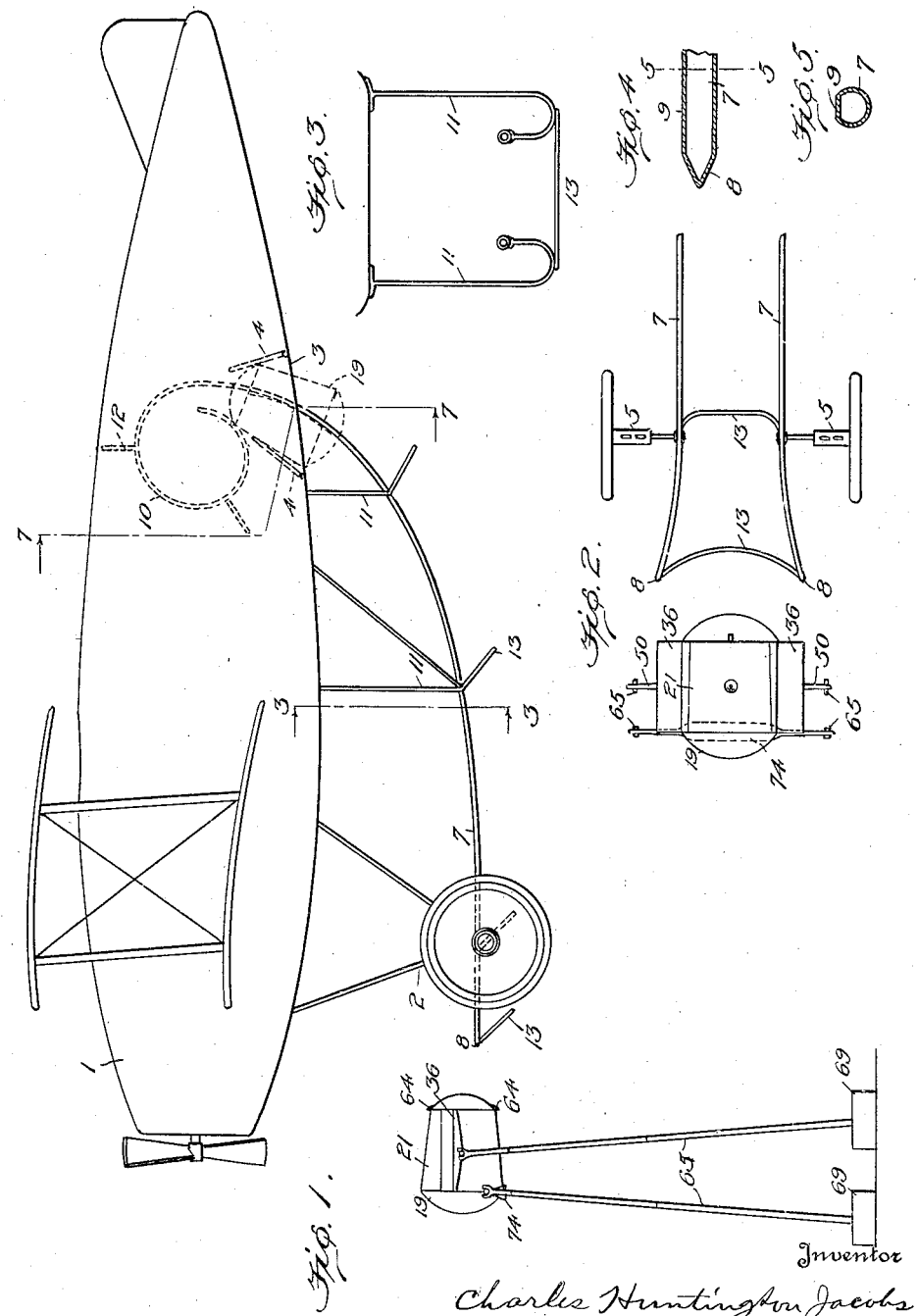

Jan. 21, 1930. C. H. JACOBS ET AL 1,744,638
APPARATUS FOR LOADING AIRCRAFT
Filed Sept. 10, 1925  5 Sheets-Sheet 2

Inventor
Charles Huntington Jacobs
Asa Foster Harshbarger
By L. D. Underwood
Attorney

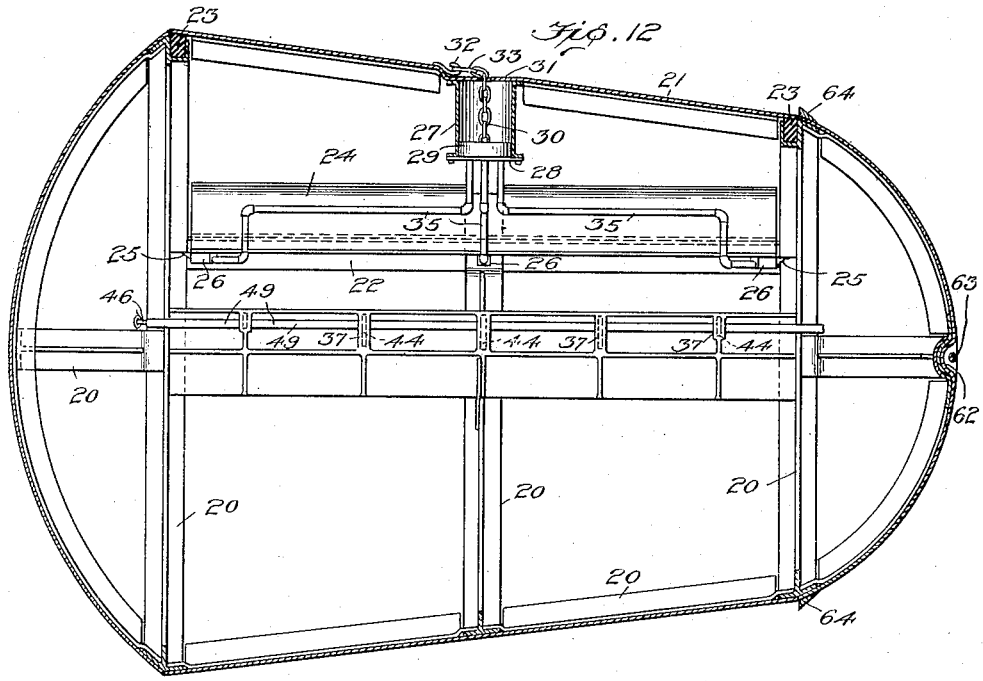
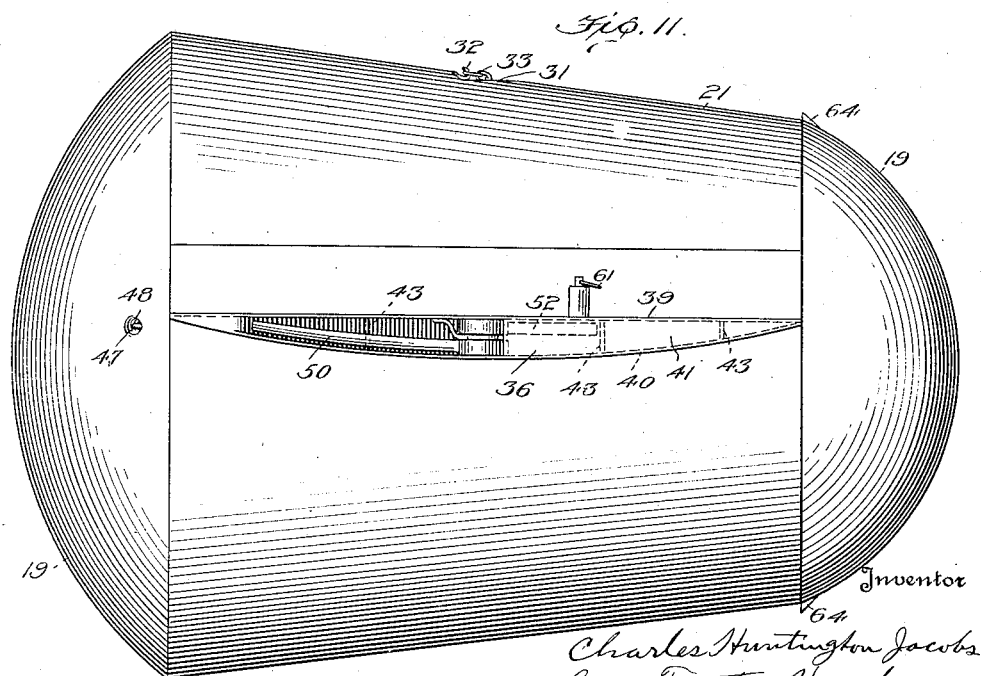

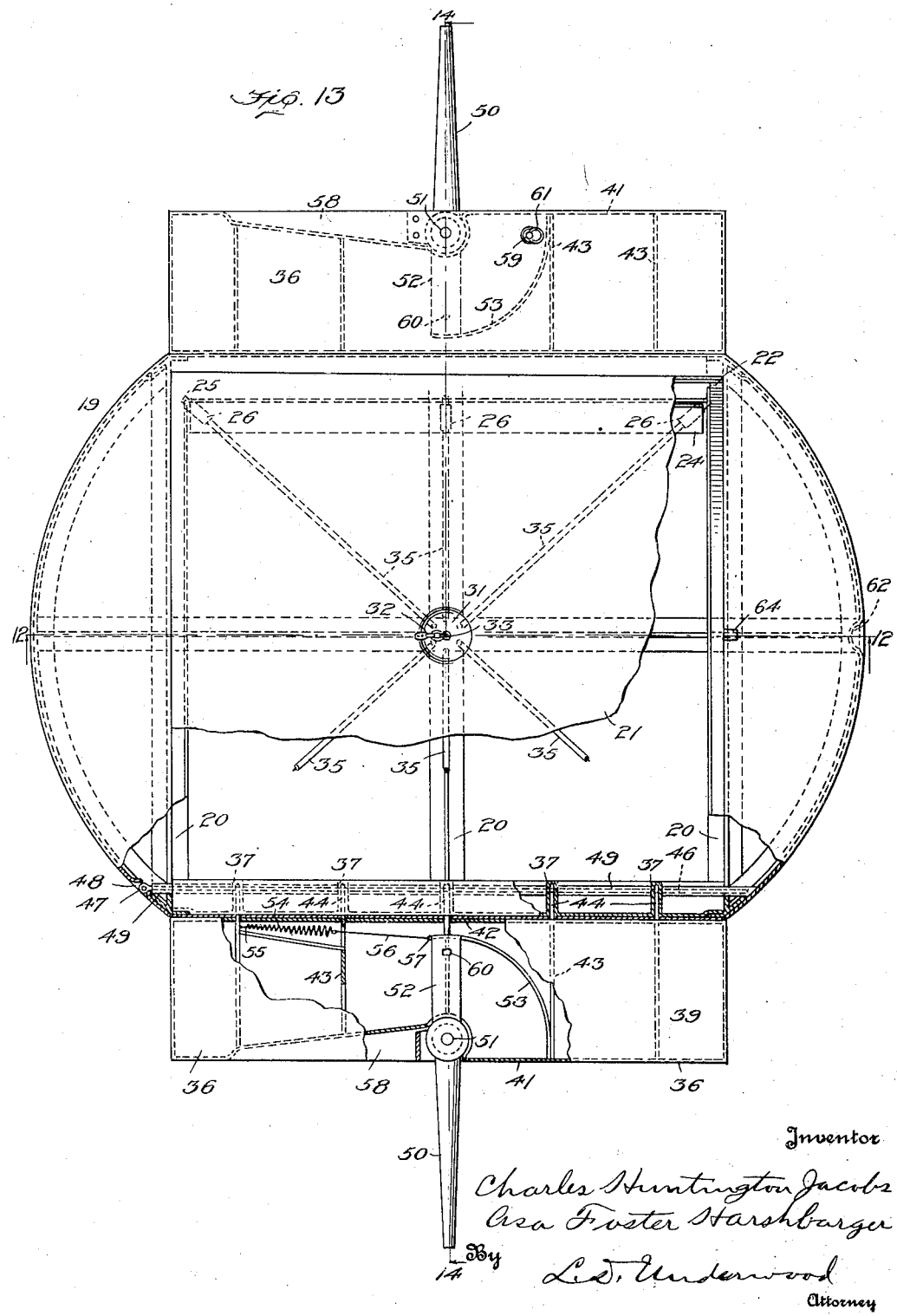

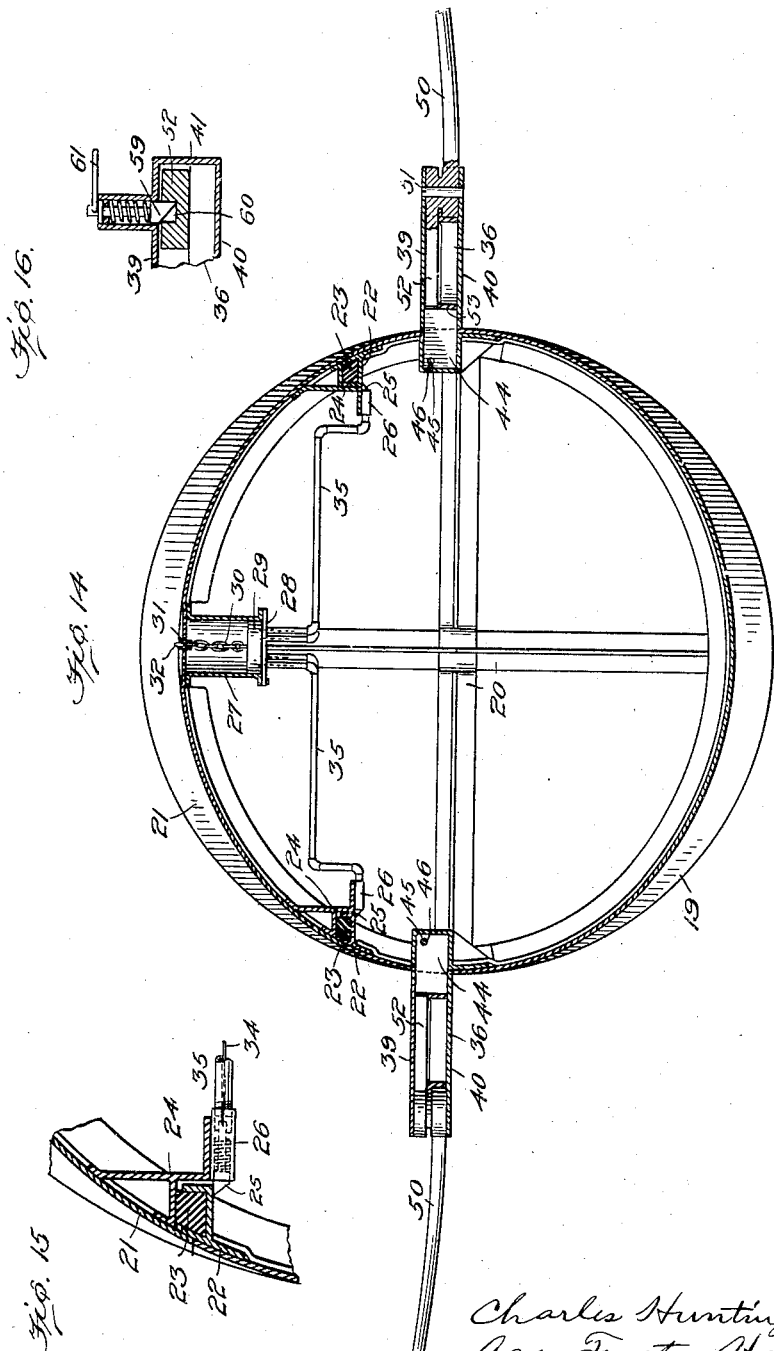

Patented Jan. 21, 1930

1,744,638

UNITED STATES PATENT OFFICE

CHARLES HUNTINGTON JACOBS, OF SAN FRANCISCO, AND ASA FOSTER HARSH-BARGER, OF OAKLAND, CALIFORNIA

APPARATUS FOR LOADING AIRCRAFT

Application filed September 10, 1925. Serial No. 55,504.

The invention relates to an apparatus for loading aircraft while the latter is in motion.

The object of the invention is to effect the loading of aircraft while the same is in motion in order to avoid the delay, expense, and inconvenience incident to stopping and starting.

For the attainment of this object we employ a holder or carrier into which mail, oil, or merchandise, or matter to be transported by the aircraft, is placed and secured. A support for this cargo carrier is provided which holds the carrier above the surface of land or water where it is found desirable to position the cargo carrier for engagement by the aircraft. While so supported the aircraft is maneuvered to such a position in proximity to the carrier, as to engage parts connected with the aircraft with the carrier, remove it from its support, and thereafter bring it to rest at a suitable point on the aircraft at which it is to be stored while in transit. A part of the momentum of the aircraft is utilized to overcome the inertia of the cargo carrier, means being provided on the aircraft to apply a continuously acting force to the carrier, whereby its speed is gradually increased to equal the speed of the aircraft, and by which the carrier is brought to rest thereon.

The invention claimed in this application is confined to apparatus for loading aircraft, but a cargo carrier adapted to cooperate with the loading apparatus, and a holder for the carrier adapted to hold the carrier in position to be engaged by the loading apparatus, both of novel construction, are disclosed herein, for the purpose of showing how the loading apparatus is to be made useful. The cargo carrier and holder therefor will be made the subjects-matter for divisional applications.

Referring to the annexed drawings which disclose the best form of embodiment so far devised by us:

Figure 1 is a diagrammatic side elevation of an airplane equipped with our loading device and a cargo carrier supported for engagement thereby;

Fig. 2 is a top plan view of the front portion of the track, mounted on the landing gear, and the cargo carrier as it is held on the top of its supporting means;

Fig. 3 is a cross section through the rails of the track on line 3—3 of Fig. 1;

Fig. 4 is a longitudinal section through the forward end of one of the rails;

Fig. 5 is a cross section on line 5—5 of Fig. 4;

Fig. 11 is a side elevation of the cargo carrier;

Fig. 12 is a cross section thereof on line 12—12 of Fig. 13;

Fig. 13 is a top plan view of the cargo carrier, partly in section, to show more clearly one of the wings thereof;

Fig. 14 is a cross section through the cargo carrier on line 14—14 of Fig. 13;

Fig. 15 is a detail sectional view showing the latch for locking the cover of the cargo carrier; and Fig. 16 is a detail sectional view showing the latch for holding the supporting arm of the cargo carrier in its folded position.

Figure 7:
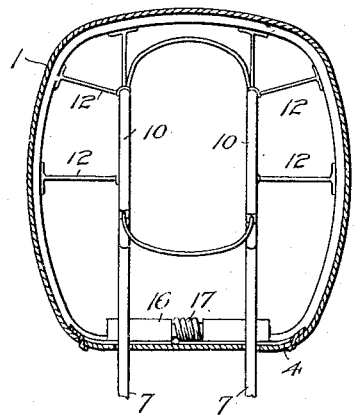
Fig. 7 is a cross section through the airplane on line 7—7 of Fig. 1.
Figure 6:
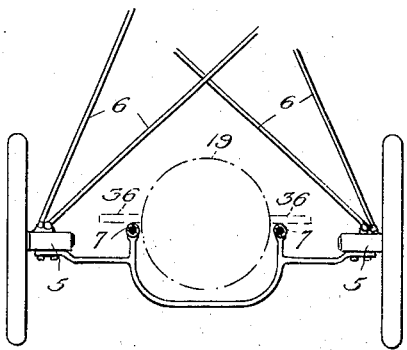
Fig. 6 is a front elevation of the landing gear of an airplane showing the loading track attached thereto.
Figure 8:
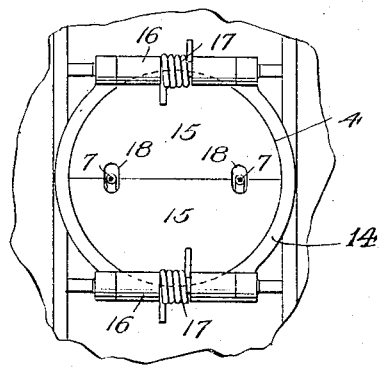
Fig. 8 is a top plan view of the trap door closing the opening on the underside of the fuselage at the rear.
Figure 9:
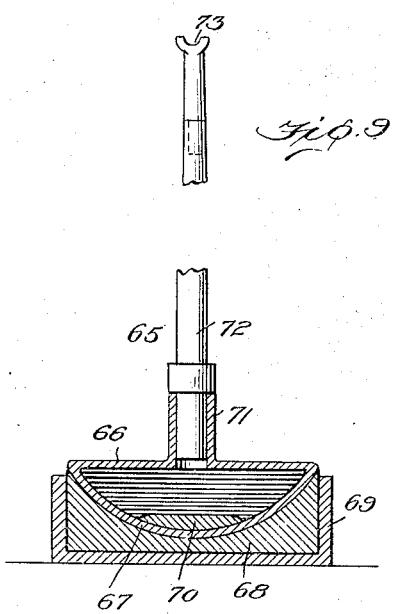
Fig. 9 is a detail view partly in section of one of the cargo carrier supporting standards.

Referring now to the drawings in detail, an airplane 1, having a landing gear 2, is provided with an opening 3 at the bottom of the fuselage near its rear end, covered by a trap door 4 (see Figs. 1 and 8). This invention is applicable to aircraft of all kinds, but in the type selected for illustration the axles 5 of the landing gear (see Fig. 6), are supported from the fuselage by suitable braces 6, providing desirable space in which the conveyor of our invention is located. A suitable conveyor or track is provided which consists, in the embodiment shown, of two rails 7 secured to the lower part of the fuselage and extending from a point slightly in front of the axles of the landing gear rearwardly and upwardly through the opening 3 in the fuselage. These rails are each preferably made of hollow metal pointed at the front end 8 (see Fig. 4), but round in cross section except that the upper portions are flattened as indicated at 9, Fig. 5. The rear ends of these rails are formed into a loop or ram's horn inside the fuselage as shown at 10, Fig. 1, for a purpose hereinafter described. These rails extend parallel to each other beneath the longitudinal axis of the fuselage for a greater portion of the distance, but at the front ends they diverge in order to provide for any inaccuracy in maneuvering the plane in the center of the cargo carrier which is to be engaged thereby. These rails are supported from the fuselage preferably by J-shaped brackets 11 and by brackets connected with the landing gear. The rear looped ends of the rails are supported by suitable brackets 12 connected with the framework on the inside of the fuselage. The rails are braced laterally by suitable cross braces 13.

A frame 14 surrounds the opening 3 in the bottom of the fuselage, upon which the trap door 4 is mounted. This trap door consists of two semi-circular sections 15 each secured by spring-pressed hinges 16 to the frame 14 along the curved edges of the sections. Strong springs 17 are employed which urge the sections of this trap door to their closed positions so as to form a smooth surface for the underside of the fuselage. The springs are made strong enough to resist the pressure of the air tending to open them. Notches 18 are cut into the meeting edges of the trap doors to receive the rails of the track extending therethrough.

*The cargo carrier.*—It is obvious that the conveyer above described is not adapted to receive and convey all kinds of packages. We have therefore devised a special receptacle or container for the oil, mail or merchandise to be loaded into the aircraft. It is designated by the numeral 19 which we call a cargo carrier, or carrier. This carrier consists of a light metallic shell of general egg-shape. Its outer surface is substantially smooth, except as hereinafter stated, and inside it is braced by suitable longitudinal and transverse braces 20 forming a skeleton framework to provide the necessary strength. The carrier has an opening in the top closed by a cover plate 21. A flange 22 surrounds this opening upon which is secured a suitable gasket 23. To the margins of the cover plate and depending therefrom is secured a frame 24 which rests on the gasket 23 around the margin of the opening. This cover plate is retained in closed position by a plurality of spring-pressed latches 25 which may be operated from the outside of the cover plate. These latches 25 are mounted in the depending frame 24 and are normally pressed outwardly by coil springs 26 (Fig. 15) and engage the underside of the flange 22 surrounding the opening in the carrier. To provide for the operation of these latches from outside the cover a depending socket 27 is secured to the underside of the cover at its center, provided with a plate 28 at its bottom having as many small openings as there are latches to be operated—there being six latches in the embodiment illustrated. Inside the socket is a plunger 29, having connected thereto, at its upper side, a pull-chain 30, by which the latches 25 are withdrawn, and which also serves as a handle to remove the cover plate 21 and as a means to hold the latches in their withdrawn position as hereinafter described. The upper end of the socket is also closed except for an opening through which the chain 30 passes. In a depression 31 in the cover above the socket 27 there is fixed a hook 32 which is adapted to be engaged by the links 33 of the chain 30. The latches 25 are constantly urged outwardly into locking position by the coil springs 26. In order to withdraw the latches from locking position their inner ends are connected by means of piano wires 34 (Fig. 15) to the plunger 29, the wire being guided by sections of small pipe 35 secured in the frame 24 and the bottom plate of the socket 27. A pull on the chain 30 serves to draw the plunger 29 upwardly in the socket, thus pulling on the piano wires 34 connected to the plunger at one end and to the latches at the opposite end. The latches 25 may be held in unlocked position by engaging one of the intermediate links of the chain with hook 32, and when the cover is locked the end link of the chain is engaged with said hook 32. The plunger 29 and the socket 27 in which it moves may be provided with suitable packing to prevent the entrance of dust and water.

In order conveniently to permit the cargo carrier to move on the track and into the fuselage, the carrier is provided on its sides and at diametrical points with laterally extending wings 36, these wings being adapted to engage and move on the rails 7 of the track, while the body of the carrier lies between the rails. The wings 36 are detachably connected with the shell of the carrier for reasons hereinafter stated. The structure and arrangement of the wings is shown in Figs. 11 to 14. Both wings have the same construction and are connected in the same way to the shell, and therefore but one will be described. The shell is provided along its side with a plurality of outwardly opening sockets 37, rectangular in cross-section, to receive tenons projecting from the wings 36.

Each wing is formed of a substantially flat upper plate 39, a curved lower plate 40, a plate 41 connecting the outer edges of the plates 39 and 40, and an inner plate 42 connecting the inner edges of the same, the inner plate being slightly curved to closely fit the curved contour of the body of the carrier. Between the upper and lower plates 39 and 40 and connecting them together are a plurality of ribs 43. These ribs 43 are extended beyond the inner edges of the wings to form tenons 44, which enter the sockets 37 in the sides of the shell. The tenons are detachably held in the sockets in any suitable way, but in the embodiment shown, the walls of the sockets 37 and the tenons 44 are provided with registering apertures 45 (Fig. 14) through which passes a rod 46 (Fig. 13) having an eye 47 at its end seated in a depression 48 in the shell of the carrier, the eye serving as a convenient means for withdrawing the rod. The rod is detachably held in any suitable way, but as shown in the drawings, it is held by frictional engagement with the sockets and tenons and a series of tubular members 49 fixed in the shell in alinement with the apertures 45. By engaging the eye 47 of the rod 46 with any suitable instrument the rod may be withdrawn, whereupon, by pulling the wing laterally outward the tenons will be withdrawn from the sockets and the wing thereby freed from the shell.

As a means for holding the carrier on a suitable support for engagement by the moving aircraft, and also to insure engagement thereby, the wings are provided with pivoted arms normally extending beyond the outer edges of the wings but capable of folding within them in order to permit the carrier to enter the trap door in the fuselage. This arm, designated by 50, is pivoted to the outer edge of the wing about midway its ends, as indicated at 51. Integral with arm 50, but on the opposite side of the pivot, is a short arm 52, preferably arranged to ride upon and be supported by a track 53 connected to the wing. To hold the arm normally projected from the wing a spring 54 is suitably connected at one end, as at 55, to one of the ribs 43 of the wing, its other end being flexibly connected by means of a wire 56 to the inner end of the short arm 52, as indicated at 57. A pocket 58 formed in the outer edge of the wing receives the arm 50 when forced into this position. The arm is slightly curved to conform to the shape of the pocket 58 in which it rests, and its lower surface is substantially flush with the upper surface of the lower wing plate 40. When the arm is folded into this pocket it is desirable to retain it there in opposition to the pull of spring 54 tending to project it outwardly, for which purpose a spring-pressed latch 59 (Figs. 13 and 16) is set into the top of the wing in position to engage a recess 60 in the outer end of the short arm 52 when the arm 50 rests in the pocket 58. A ring 61 serves as a handle to withdraw the latch from locking position.

As above stated, the carrier is, in general, egg-shaped. More specifically stated, as illustrated in the drawings, the ends of the carrier each have a substantially spherical surface, one larger than the other, these ends being connected by a cylindrical surface flattened in one dimension, the elements of the surface, at diametrical points 90° from the wings, converging, as indicated in Fig. 11, and the elements of the surface at right angles thereto, i. e., at the points of connection with the wings, being parallel, as shown in Fig. 13. In the smaller end of the carrier a recess 62 is formed, across which extends a bar 63, which serves as a means of attachment for a hook or the like (not shown) for the purpose of handling it, as hereinafter described. At the junction of the cylindrical surface and spherical surface forming the smaller end of the carrier and at 90° from the wings, wedge-shaped lugs 64 (Figs. 11 and 12) are provided, for a purpose hereinafter described.

Figure 10:
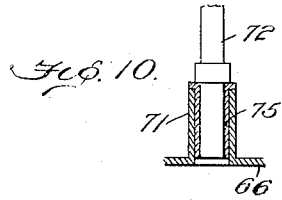
Fig. 10 shows a short section of tubes as employed with the standard depicted in Fig. 9.

*Carrier supporting means.*—Means for supporting the carrier over land or water for convenient engagement by the conveyor on the aircraft are shown in Figs. 1, 2, 9 and 10. This means consists, in the embodiment shown, of four standards 65 arranged in a rectangle. Each standard consists of a hollow metallic base 66 (Fig. 9) having a spherical lower surface 67, resting in a conforming cup 68, which is in turn mounted in a cylindrical open topped container 69 confining the base 67 and cup 68, the margin of the base 66 engaging the inner edges of the container 69. The base 66 is provided with a weight 70, above which is a socket 71 which forms a seat for the lower end of a support formed of detachable sections 72. These sections preferably are of conical formation and are joined together by sockets and tenons, after the manner of the ordinary fishing pole, except that the joints are only frictionally engaged. Any number of sections may be employed depending upon the circumstances, or one section may be sufficient. The upper section is short and is provided at the top with a notch 73. The notches 73 in the two front standards (Figs. 1 and 2) support the ends of a plate 74 curved to conform to the outer surface of the carrier. The supporting arms 50 extending from the wings 36 rest in the notches 73 in the two rear standards. Inasmuch as the arms 50 extend from the middle of the carrier and the supporting plate 74 engages the outer surface of the front portion of the carrier, the upper notched sections of the rear standards are made longer than those of the front standards, as shown in Fig. 1, so that the carrier may be supported with its longitudinal axis in a horizontal plane. Where a number of sections 72 are furnished to support the carrier at a maximum distance above the surface flown over, and it is desired to use less than the whole number of sections so as to bring the carrier closer to the surface flown over, less than the whole number of sections may be used, but the upper sections having the notches 73 must always be employed, and if but one other section were employed it is obvious that if such section fitted the notched upper section it would not fit the base at the lower end. For this reason a short tubular section 75 (Fig. 10) is provided to fit into the socket 71 so as to make it conform in size to the tenon of the section to be fitted thereinto, as indicated in Fig. 10.

*Operation.*—The operation is as follows: Assuming that mail is to be transported, the cover 21 of an empty carrier is removed by pulling on the chain 30 (Fig. 12) which disengages the latches 25 from the shell of the carrier, whereupon they are locked in released position by engaging one of the intermediate links of the chain 30 (Fig. 12) with hook 32. The mail matter is then inserted through the opening in the carrier and the cover applied, the latches 25 being released by disengaging the chain from hook 32, permitting the latches 25 to move into locking position, at the same time engaging the end link 33 of the chain with said hook so as to hold it in position to be readily accessible when it is desired to unlock the cover. With the supporting arms 50 outstanding, as shown in Fig. 14, these arms are rested in the notches 73 of the rear pair of standards 65 (Figs. 1 and 9), the forward part of the cargo carrier being supported by the plate 74 (Fig. 1) which in turn is supported by the front pair of standards. The cargo carrier is then ready to be engaged by the aircraft. The pilot maneuvers the aircraft toward the small end of the carrier with the forward ends of the rails 7 of the conveyer as nearly in line with the longitudinal axis of the carrier as his skill will permit. If the pilot should bring the conveyer directly into this line the forward ends of the rails 7 will engage the curved lower sides 40 of the wings 36. As the aircraft moves forwardly and engages the carrier, the arms 50 of the carrier are disengaged from the notches 73 of the rear pair of standards, and the front part of the carrier is disengaged from the plate 74 as the carrier rides upon the rails 7 of the track. In the operation of disengaging the carrier from the support the upper sections of the standards and the plate 74 may be disassembled and the standards may be moved into a different position, but because of the construction and manner of support of these standards at the base they will not rebound against the aircraft.

The track is inclined rearwardly and upwardly, and, if it be assumed that the aircraft is moving in a horizontal plane, the force exerted by the track to overcome the inertia of the carrier may be considered to have one component which lifts it upwardly and another which acts directly to overcome its inertia and gradually increase its speed until it equals that of the aircraft. Frictional engagement of the conveyer with the carrier would also assist in this operation. As a general practice the air craft would not be moved in a horizontal plane at the time of engagement and immediately thereafter, but in an upwardly inclined plane, which would facilitate the result desired, for obvious reasons. The disparity in speed of carrier and aircraft gradually decreases as the carrier approaches the trap door 4, the inertia remaining in the carrier, however, being sufficient to carry it either partly through the trap door or entirely therethrough into the fuselage. The supporting arms 50 on the wings remain extended until the carrier reaches the trap door. When these arms come into engagement with the frame surrounding the trap door they are forced into the pockets 58 where they are held by the latches 59. If sufficient inertia remains in the carrier to cause it to pass entirely through the trap door, it will continue its movement into the looped portion 10 of the conveyer and be brought to rest therein. If the remaining inertia is sufficient only to cause its end to enter through the trap door, any downward motion thereof will be restrained by the engagement of the lugs 64 on the end of the carrier (Fig. 11) with the edges of the trap door whose springs 17 constantly press them in a direction to effect such engagement. In this case, while so supported, an attendant will attach a hook to the bar 63 at the end of the carrier (Fig. 12) and draw it into the looped portion 10 of the conveyer. The attendant will then withdraw the rods 46 (Figs. 11 and 12) and remove the wings 36 from the sides of the carrier, after which the carrier will be moved between the rails 7 into a storage space in the fuselage.

Should the pilot fail to position the aircraft in the longitudinal axis of the carrier as it rests upon the supporting standards 65 but approaches it in a line slightly to the right or left thereof, or at an angle, the ends of the rails 7 will not engage under both wings 36. In such case one of the diverging ends of the rails 7 will engage the rounded surface of the carrier and the other will engage the opposite supporting arm 50. As the aircraft continues its forward motion the rail engaging the curved surface at one side of the carrier will deflect it laterally, together with the standards 65, which have freedom of movement in all directions, until the carrier is centered upon the conveyer, with the wings 36 resting upon the rails 7.

If the speed of the aircraft is too great compared to the weight of the carrier and the strength and arrangement of the conveyer, to effect the operation described, the carrier may be given an initial movement in the direction of flight of the aircraft at the proper time, as by means of a catapult mounted on an elevated turn-table, or by a self-propelling wheeled vehicle or a boat upon which the carrier may be mounted, the movement thereof being initiated automatically by the aircraft as it approaches the carrier, or by hand.

While we have described a specific embodiment of our invention, the invention is not confined thereto. The invention may be applied to land planes, sea planes, or any other aircraft, it being only necessary that the conveyer be so constructed and arranged with reference to other features of construction as to provide sufficient space to receive and convey the carrier to the fuselage.

While a rearwardly and upwardly inclined track is shown whereby the thrust of the conveyer (due to its superior velocity) is resolved into components which lift the carrier and at the same time give it a forward impetus and gradually accelerate its speed to that of the aircraft, the same result may be attained in other ways, the broad idea of the invention involving the gradual application of force derived from the momentum of the aircraft to overcome the inertia of the cargo carrier and bring it to rest thereon, assisted by friction or other retarding means. The track of the conveyer may consist of two rails, as shown, or of a single rail, of a chute or tube, or other form. We have shown a loop or ram's horn forming the upper end of the track to bring the cargo carrier finally to rest, but other means may be employed; for example, the cargo carrier might be caused to engage with a resisting medium controlled by variable air pressure or spring means. The loop at the upper end of the track may be of substantially cylindrical form, thereby forming a sort of squirrel cage, in which the carrier may circle indefinitely until brought to rest by friction, or the rails at the extreme end of the track may be provided with a crossbar connected at its ends to the respective rails by means of coil springs to act as a bumper to bring the carrier finally to rest. The carrier may be of any shape suitable to the track and to the trap doors through which it passes into the aircraft. The support for the carrier while being engaged by the aircraft may be of forms other than that shown, the desideratum being that it shall be so constructed as to hold the carrier in a fixed position while being engaged, but capable of readily yielding to permit the carrier to be properly positioned for complete engagement by the aircraft in the event that the pilot fails to maneuver the aircraft with exactness, and to offer no substantial resistance to the aircraft.

It has heretofore been proposed to capture a package resting upon land or sea by flexible means depending from aircraft, but such means have not been successful. So far as we are aware, we are the first to provide means on aircraft to directly and positively engage a package resting upon a fixed support, and we claim the idea broadly with all equivalents operating within the principles disclosed.

We claim:

1. An aircraft loading device comprising, in combination with the aircraft, means for engaging a cargo carrier while the aircraft is in motion comprising a track depending from the fuselage having provision for opposing the inertia of the carrier to gradually bring the carrier to rest on the aircraft.

2. An aircraft loading device comprising, in combination with the aircraft having a hold, means for engaging a cargo carrier while the aircraft is in motion, and means connected therewith for conveying the carrier to the hold, adapted to apply to said carrier a progressively increasing force for gradually bringing the same to rest therein.

3. An airplane loading device comprising a rearwardly and upwardly extending track secured to the fuselage beneath its longitudinal axis, the rear end of the track entering an opening near the rear end of the fuselage.

4. The combination specified in claim 3 with the track ending in a loop inside the fuselage to check the motion of a cargo carrier conveyed thereby.

5. The combination specified in claim 3 with the track ending in a loop inside the fuselage to check the motion of a cargo carrier conveyed thereby, and additional means at the end of the loop to further check the same.

6. An airplane loading device comprising a track formed of rearwardly and upwardly inclined rails secured to the fuselage in spaced relation to each other beneath its longitudinal axis, the front ends of the rails being flared outwardly, and the rear ends thereof entering an opening near the rear end of the fuselage.

7. An airplane loading device comprising a track formed of rearwardly and upwardly inclined rails secured to the fuselage in spaced relation to each other beneath its longitudinal axis, the front ends of the rails being flared outwardly, and the rear ends thereof entering an opening near the rear end of the fuselage and formed into a loop.

8. An airplane loading device comprising, in combination, a hinged trap door near the rear end of the fuselage, and a rearwardly and upwardly extending track secured to the fuselage beneath its longitudinal axis adapted to convey a cargo carrier through said trap door.

9. An airplane loading device comprising, in combination, a hinged trap door near the rear end of the fuselage, a rearwardly and upwardly extending track secured to the fuselage beneath its longitudinal axis, a cargo carrier adapted to be received on the track and to enter the trap door, and cooperating means on the entering end of the cargo carrier and the trap door to hold the carrier against downward motion after its end has entered part-way through the trap door.

10. An airplane loading device comprising a rearwardly and upwardly extending track secured to the fuselage beneath its longitudinal axis, the front end of the track being flared transversely and the rear end thereof entering an opening near the rear end of the fuselage, and a cargo carrier adapted to be received on the track and conveyed through said opening into the fuselage, said cargo carrier having curved sides at the end which first engages the track.

11. An airplane loading device comprising, in combination, a trap door covering an opening near the rear end of the fuselage consisting of two semi-circular members hinged on their curved edges to cause the straight edges of the members to meet on a diameter of the opening, a rearwardly and upwardly inclined track secured to the fuselage beneath its longitudinal axis, its rear end extending to the trap door, a cargo carrier adapted to be received on the track and to enter the trap door, and lugs on the entering end of the cargo carrier adapted to engage the edges of the trap door members to hold the carrier against downward motion after its end has entered part-way through the trap door.

12. An aircraft loading device comprising, in combination with the aircraft, a cargo carrier, a support for the carrier mounted by means of a universal connection having freedom of motion in different directions to sustain the carrier for engagement by the aircraft, means on the aircraft for engaging the carrier while so held, and means connected with the aircraft for opposing the inertia of the carrier to gradually bring it to rest in the aircraft.

In testimony whereof we affix our signatures.

CHARLES HUNTINGTON JACOBS.
ASA FOSTER HARSHBARGER.